United States Patent [19]

Burke et al.

[11] Patent Number: 5,347,651

[45] Date of Patent: Sep. 13, 1994

[54] SYSTEM FOR ALLOCATING WORM OPTICAL MEDIUM FILE STORAGE IN GROUPS OF FIXED SIZE ADDRESSABLE AREAS WHILE TRACKING UNRECORDED AREAS AND END OF VOLUME

[75] Inventors: William T. Burke, Tucson, Ariz.; Larry W. Loen; Randy K. Rolfe, both of Rochester, Minn.

[73] Assignee: International Business Machines Corporation, Armonk, N.Y.

[21] Appl. No.: 689,584

[22] Filed: Apr. 23, 1991

[51] Int. Cl.5 ............. G06F 15/40; G06F 12/06
[52] U.S. Cl. ............. 395/600; 395/400; 395/425; 395/700; 369/49; 369/58; 369/59; 364/DIG. 1; 364/222.81; 364/244; 364/245; 364/246; 364/246.3; 364/249.4; 364/251.5; 364/282.2
[58] Field of Search ......... 395/600, 425, 400, 700; 369/58, 49, 59

[56] References Cited

U.S. PATENT DOCUMENTS

| | | | |
|---|---|---|---|
| 4,627,019 | 12/1986 | Ng | 395/425 |
| 4,791,623 | 12/1988 | Diotte | 369/59 |
| 4,827,462 | 5/1989 | Flannagan et al. | 369/32 |
| 5,034,914 | 7/1991 | Osterlund | 395/425 |
| 5,043,967 | 8/1991 | Gregg et al. | 369/59 |
| 5,053,948 | 10/1991 | DeClute et al. | 395/600 |
| 5,073,887 | 12/1991 | Takagi et al. | 369/100 |
| 5,111,444 | 5/1992 | Fukushima et al. | 369/58 |
| 5,119,291 | 6/1992 | Flannagan et al. | 395/400 |
| 5,129,088 | 7/1992 | Auslander et al. | 395/700 |
| 5,210,734 | 5/1993 | Sakurai | 369/49 |
| 5,247,660 | 9/1993 | Ashcraft et al. | 395/600 |

FOREIGN PATENT DOCUMENTS 0328240  1/1989  European Pat. Off. .
0333165  3/1989  European Pat. Off. .

Primary Examiner—Thomas C. Lee
Assistant Examiner—Wayne Amsbury
Attorney, Agent, or Firm—H. F. Somermeyer

[57] ABSTRACT

A removable optical disk of the write once type is managed to minimize size of the control area for user data recorded on the disk. Instead of recording each recorded file indicating token (serial number) as each file is recorded, a maximum value file token having a numerical value greater than a previous maximum value token is recorded in the control area such that any optical recorder receiving the disk may start recording data using such maximum value token. If the file indicating token values reach the maximum value token, then a new maximum value token is created. A pseudo end of volume (EOV) value is maintained which points to a one of the addressable data storing ares of the disk which is allocated and not recorded as EOV. All allocated data storing areas with addresses greater than EOV are recorded in contiguously addressed data storing areas. When any data storing area having an address higher than EOV is left unrecorded, then EOV is updated to point to that unrecorded allocated data storing area. When either the maximum value token or EOV are changed or updated, both the EOV and maximum value token are recorded in the control area. Operations in a closed environment, super or umbrella allocation sizes and reduced EOV values are also disclosed.

32 Claims, 4 Drawing Sheets

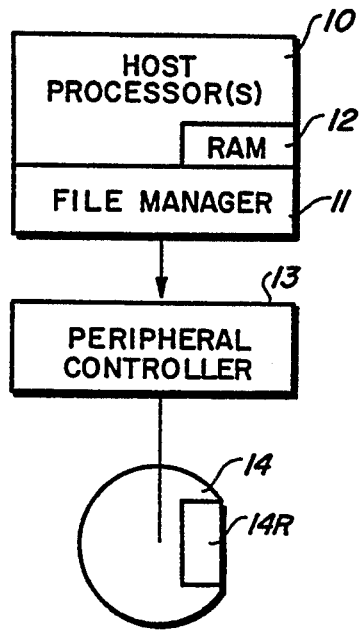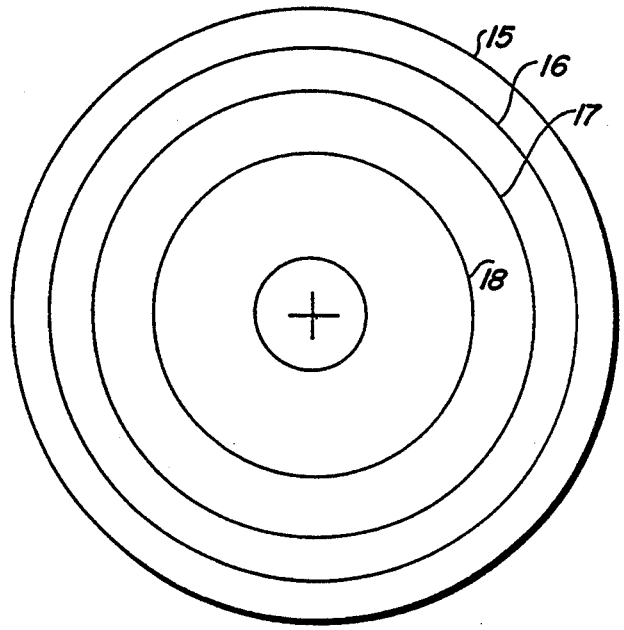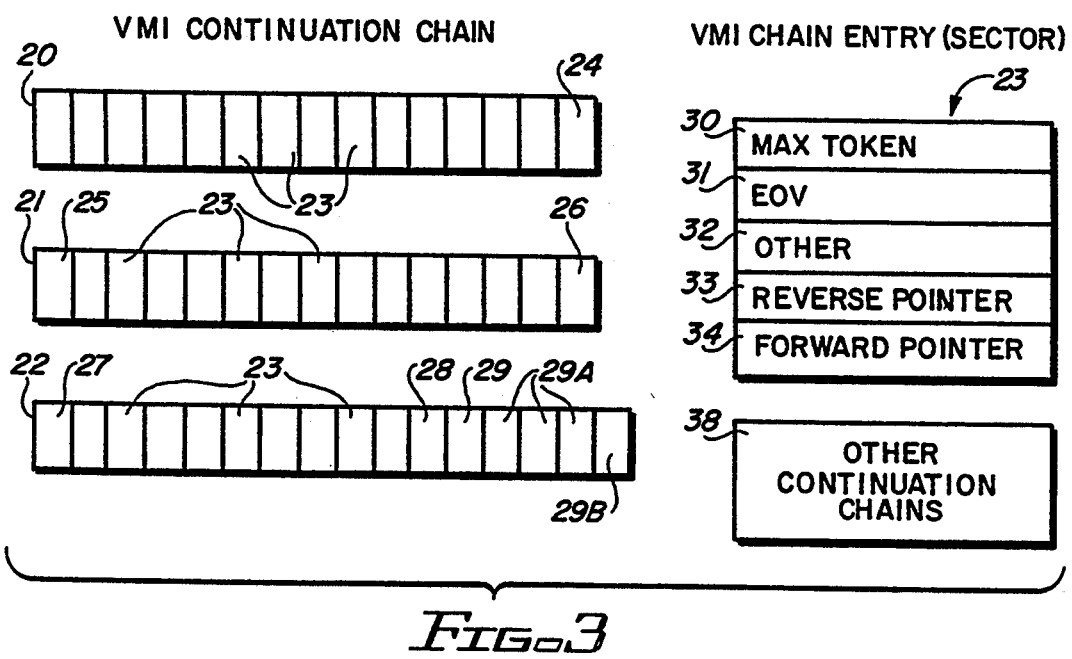

SYSTEM FOR ALLOCATING WORM OPTICAL MEDIUM FILE STORAGE IN GROUPS OF FIXED SIZE ADDRESSABLE AREAS WHILE TRACKING UNRECORDED AREAS AND END OF VOLUME

FIELD OF THE INVENTION

The present invention relates to using storage media, particularly write-once (preferably optical) media, for facilitating accessing recorded and unrecorded addressable areas and a new format for such storage media.

BACKGROUND OF THE INVENTION

Optical media of the write-once read-many (WORM) have been used for several years for permanently recording diverse data. Each WORM medium, usually a disk, also stores control information including a directory to the stored user or other data. It has been a usual practice to record successively in contiguous sectors or addressable areas of the disk or medium. That is, recording proceeds from a radial inward extremity, for example, toward a radial outward extremity. As the recording proceeds, all addressable areas between the radial inward extremity to the last recorded data/control are storing data. One approach to such recording is to record the non-directory data beginning at one radial extremity and record the directory beginning at a second radial extremity. In other systems, recording of directory and non-directory data proceeds from one extremity toward a second extremity.

It is desired to record data on a WORM medium wherein null or unrecorded addressable areas are interspersed with addressable areas storing data. It is also desired to operate with a WORM medium in a manner to minimize or reduce the number of addressable areas used by control information; i.e. a control of the medium, and the resulting medium, are desired to facilitate finding the last recorded data (end of the volume or EOV) as well as reducing the number of times control information is recorded, such as recording an EOV pointer and file-indicating tokens. Such tokens are alphanumeric or numeric values identifying files recorded on a medium. Such tokens are usually transparent to a computer user, i.e. the tokens are an internal mechanism of a data storing system. It is desired to reduce the number of addressable areas required for storing successively increasing values of an EOV pointer and file-indicating tokens.

DISCUSSION OF THE PRIOR ART

The U.S. Pat. No. 4,827,462 by Flannagan et al shows recording data on a WORM optical medium. This patent teaches that directory data are recorded beginning a first radial extremity of an optical disk and proceeding toward a second radial extremity of the optical disk while non-directory data are recorded beginning at the second radial extremity and proceeding toward the first radial extremity. All recording operations record data in a next vacant addressable area (disk sectors) such that no unrecorded but recordable addressable areas are interspersed between recorded addressable areas. When the recorded non-directory data meet the recorded directory data on a disk, that disk is full.

Diotte in U.S. Pat. No. 4,791,623 shows a specific intermingling of directory and non-directory data on a WORM disk in which the directory data are dispersed on the disk between non-directory data which have an addressing affinity for the nearest directory data. It appears that all addressable areas (sectors) are recorded into in a continuous sequential procedure.

It is desired to provide enhancements over the prior art which facilitate space-management and data accessing in a data-storing medium.

SUMMARY OF THE INVENTION

It is an object of the invention to minimize the number of addressable areas, such as disk sectors, assigned to storing control information by managing the manner in which file identifiers are generated and assigned to data being recorded.

It is a second object of the invention to facilitate finding an EOV when unrecorded, but recordable, areas remain dispersed amongst recorded areas.

In accordance with one aspect of the present invention, file-identifying tokens are assigned values less than a maximum token or "max token" value. Upon reaching the maximum token value, a new maximum token value is assigned. Upon starting recording operations, the last-recorded maximum token value is found; subsequent recording operations serially assign numbers to files being recorded that are greater than the maximum token value. Each new maximum token value has a value greater than the last-recorded maximum token value.

In accordance with a second aspect of the invention, an end of volume (EOV) pointer (address of a predetermined one of the addressable areas) has a current address related to a last allocated addressable area at the time EOV pointer was generated. Such last allocation may or may not contain data when the EOV pointer is generated. Data is recordable in addressable data-storing sectors having addresses greater than the EOV pointer address, hence the EOV pointer does not always point to a true end of the volume. Sectors recorded in addressable data-storing areas having addresses greater than the EOV pointer address preferably are recorded in contiguously addressed ones of the addressable data-storing areas. To find the true end of volume, a scan of addressable data-storing areas begins at a predetermined addressable data-storing area closely related to the EOV pointed to addressable data-storing area and proceeding to higher addressed addressable data-storing areas until an unrecorded one of the addressable areas is found. Such a finding terminates the scan and indicates where data recording may ensue.

In a third aspect of the invention the first two aspects are combined to efficiently manage operations related to a WORM medium.

The foregoing and other objects, features, and advantages of the invention will be apparent from the following more particular description of preferred embodiments of the invention, as illustrated in the accompanying drawings.

DESCRIPTION OF THE DRAWING

FIG. 1 is a simplified block diagram of a data-storing system in which the present invention is advantageously employed.

FIG. 2 is a diagrammatic plan view of an WORM optical disk usable in the FIG. 1 illustrated system.

FIG. 3 is a schematic diagram of continuation chains as may be recorded on the FIG. 2 illustrated disk.

DETAILED DESCRIPTION

Figure 4:
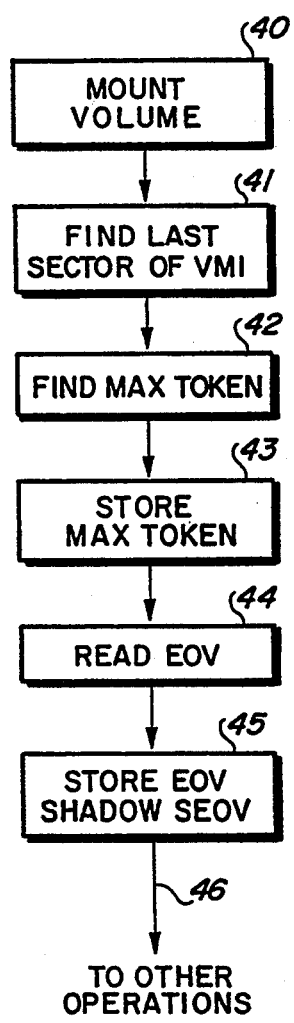
FIGS. 4 through 7 are machine operations charts illustrating a practice of the present invention in the FIG. 1 illustrated system.

Referring now more particularly to the appended drawing, like numerals indicate like parts and structural features in the various FIGURES. In FIG. 1, host processor(s) 10 have a file manager program 11 which effects the machine operations shown in FIGS. 4–6 which implements the present invention. Peripheral controller 13 connects host processor or computer 10 to one or more WORM optical disk player-recorders in a usual manner. It should be noted that peripheral controller 13 may be a pluggable circuit board in a host computer, be embedded as a part of a host computer, an attachment card to a host computer, or be a separate standing unit connected to a host computer. Such peripheral controller may also be programmed in large part in a host processor. Main memory or random access memory (RAM) 12 is shared by file manager 11 and other programs executing in host processor 10. WORM optical player/recorder (also commonly referred to as a device) 14 is attached to peripheral controller 13 in a usual manner.

FIG. 2 illustrates in simplified form a plan view of a WORM optical disk removably insertable into player 14. Disk 15 includes a multiplicity of substantially concentric tracks, three of which are indicated by numerals 16, 17 and 18, respectively. A single spiral track is often used, no limitation thereto is intended. As used herein, the term concentric track also refers to each cirumvolution of a spiral track. Assuming a transducer (not shown) is parked during disk non-use at one radial extremity of the disk, track 18 may contain the volume medium information (VMI) information. As the VMI information increases with disk usage, tracks 17 and 16 may also be used for storing some of the VMI information. Other tracks, not shown store directory and other control information as well as user data, all as is known.

WORM optical disks often use so-called continuation chains for linking stored data of a file recorded on disk 15, whether the file is a control file as VMI or a user file. In creating a VMI continuation chain, FIG. 3, groups of disk sectors, herein termed addressable data-storing areas, form a constant sized allocation unit. Such groups may be compared with cluster allocations in DOS based systems. It is preferred for allocating groups of areas for the VMI continuation chain that such area groups be an integral multiple or submultiple of the number of areas in each track. In the illustrated embodiment, a group consists of a number of areas equal to the number of areas in one track; a spiral track is assumed. Once the beginning address, address of the first area or the area in a group having a lowest address, then the address of the last area in a group is easily calculated by adding the number of areas in a group to the lowest or first address. The terms greater, higher, and the like are intended to also include subtractive serial addressing, that is a first address may be the highest address in a disk 15 with subsequently allocated or used areas being addressable or identified by decreasing address numbers.

The FIG. 3 illustrated VMI continuation chain includes three groups 20, 21 and 22 of addressable data-storing areas 23. The three groups and their addressable data-storing areas 23 are linked by address pointers, as later described. First group 20 of areas 23 resides in track 18. A last area 24 of group 20 has a disk 15 address equal to the first area address plus (minus) the number of areas in the group. Second group 21 of areas 23 is found in track 17. Groups 20 and 21 are linked as follows. Area 25 of second group 21 has a reverse pointer to last area 24 of group 20 while area 24 has a forward pointer to area 25. Similarly, second group 21 is linked to third group 22 by address pointers in last area 26 of second group 21 and in first area 27 of third group 22. For purposes of discussion, area 28 in third group 22 is the last area in the continuation chain storing VMI data. Area 29 is a first null or vacant one of the addressable data-storing areas 23 in the VMI continuation chain. The operations involving this continuation chain will become apparent from FIGS. 4–6.

Allocated group 22 of the VMI continuation chain contains several null or vacant areas 29 and 29A. Data recording proceeds on disk 15 beginning in a addressable data-storing area 29B abutting group 22 areas of disk 15. This arrangement indicates null or vacant areas 29 and 29A between recorded ones of the areas 28 and 29B. Many instances of such intervening null areas 29B between spaced-apart recorded areas occur when using the procedures described for VMI continuation chain. Such intervening null areas also occur when user data file allocations exceed the number of such allocated areas used in a first recording operation following the allocation. In finding the true EOV, such as by scanning for a first null area (lowest address null area), such intervening null areas must be ignored. The present invention uses the EOV pointer value to logically "jump" over all of such intervening null areas for quickly finding the true end of volume.

Each of the addressable data-storing areas 23 have the same format. A first field 30 stores the later-described maximum value file-indicating token (max token). Second field 31 stores the end of volume (EOV) pointer. It is noted that for practicing the present invention, the EOV pointer does not always point to a true end of volume. Other control data not pertinent to an understanding of the present invention are found in third field 32. A reverse pointer 33 contains the address of the immediately preceding area 23, i.e. reverse pointer of area 25 points to area 24. A forward pointer 34 points to the next area 23 whether or not it contains data. That is, the forward pointer in area 28 of group 22 points to the next area 29 which is null, contains no recorded data. Area 28 is defined as the last area of the VMI continuation chain even though several null areas remain in the group allocation. Once third group 22 has its last area (unnumbered) filled with data, a fourth group (not shown) is allocated to the VMI chain and a forward pointer points to the first area (not shown) of such fourth group. At this time the EOV will point to the last area (not shown) of such fourth group, i.e. there are null areas between the last area containing data and the area pointed to by EOV pointer. Therefore, the EOV pointer points to the last area on the disk not available for new recording operations, whether null or full of data. Numeral 38 denotes that all data on disk 15 is recorded using continuation chains. While the VMI continuation chain is allocated in equal-sized allocation groups, other continuation chains may have variably sized groups of allocations.

FIG. 4 shows machine operations performed when a disk 15 is mounted or loaded into player 14. Disk 15 will have a VMI continuation chain and other data stored thereon. Machine step 40 represents mounting (inserting) a disk 15 into player 14. Player 14 includes the usual apparatus for detecting disk 15 mounting. Player 14 reports the disk 15 mount to file manager 11. File manager 11 responds by a command to player 14 effecting machine step 41 which finds the last sector (addressable data-storing area) of the VMI continuation chain (FIG. 3). Such last area 28 stores the current values of EOV and the max token. Area 28 is identified by its forward pointer 34 pointing to a next-adjacent null or vacant area 29. Machine step 42 reads field 30 to find the current max token value. The current max token value is stored by machine step 43 RAM 12 in a usual manner. Machine step 44 reads the current EOV from field 31 of area 28. At machine step 45 the current EOV value is stored in RAM 12. Numeral 46 indicates other machine operations are then performed. For example, the true end of volume is first found by accessing an area on disk 15 indicated by the current EOV value. In this regard, it is noted that the EOV value may point to the last allocated area or to the area immediately following (immediately following means an area having the next address value, the address of the last allocated area plus one). According to the invention, the true EOV is the first null sector following the EOV pointed to area. In some instances, there may be many contiguous data-filled areas having addresses greater than the EOV pointer. Other machine operations also occur at 46 such as recording data onto disk 15, reading data from disk 15, reporting status and the like, as is commonly practiced in the optical recording arts.

Figure 5:
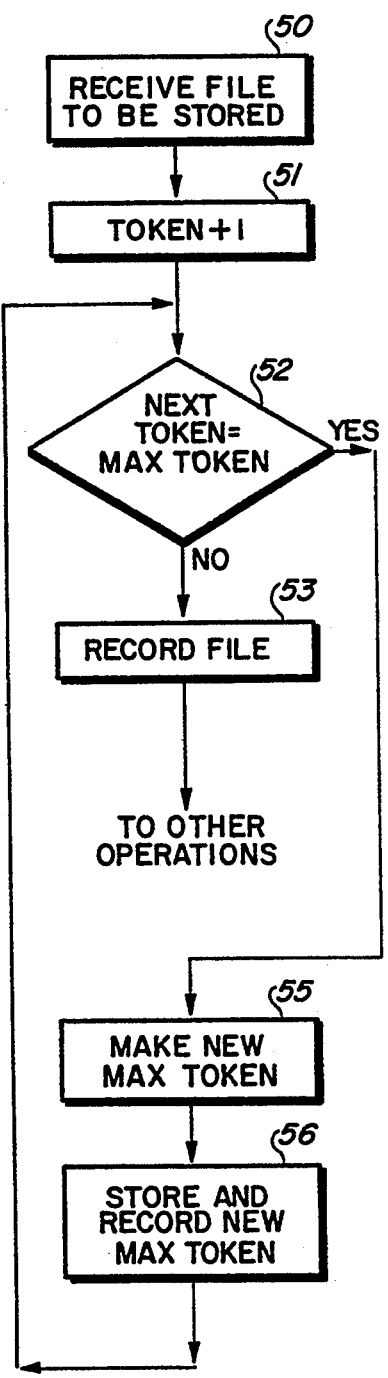

FIG. 5 illustrates, in simplified form, machine operations for storing a file of user data in contiguous addressable data-storing areas and for updating a file-indicating token value to identify this file. File manager 11 at machine step 50 receives a request for recording data as a file on disk 15. The current token value is increased by unity at machine step 51. Then, file manager 11 in machine step 52 compares the updated token value with the current value of the maximum value token (max token) retrieved from field 30 during the FIG. 4 described volume mounting. If the updated token value is less than the max token value, file manager 11 proceeds to machine step 53 recording the file on disk 15. Note that FIG. 5 omits the usual allocation step for acquiring data recording space on disk 15 for the file. After the received file is recorded, file manger 11 and other programming in host processor 10 (not shown) proceed to other machine operations.

If at machine step 52, the updated token value is not less than the max token value, then file manager 11 generates a new max token value to replace the old max token value. There is only one max token value effective at any one time. At machine step 55 file manager 11 makes a new max token by adding a predetermined value to the current max token, such as 64, 128, 256, etc. This predetermined value provides a numerical cushion enabling file manager 11 to conserve addressable areas of disk 15. In so doing, the max token indicates a minimal unique file-indicating token value usable to reinsitute recording on disk 15 as described with respect to FIG. 4. Such new max token value is selected to reduce the number of addressable areas 23 used for the VMI continuation chain by enabling recording the predetermined number of files on disk 15 without recording any additional file-indicating token values in the VMI continuation chain. Recording the new max token value in field 30 (in such a recording operation, all fields 30-34 are also recorded) in a next addressable data-storing area in the VMI continuation chain (FIG. 3), such as in null area 29, enables any player 14 to receive disk 15 and quickly begin assigning new unique file-indicating token values based upon the last-recorded max token value to files being received. Accordingly, in machine step 56, file manager 11 records the new max token value on disk 15 while retaining the value for executing machine step 52 each time a file is to be recorded on disk 15. After completing machine step 56, file manager 11 returns to machine steps 52 and 53.

Figure 6:
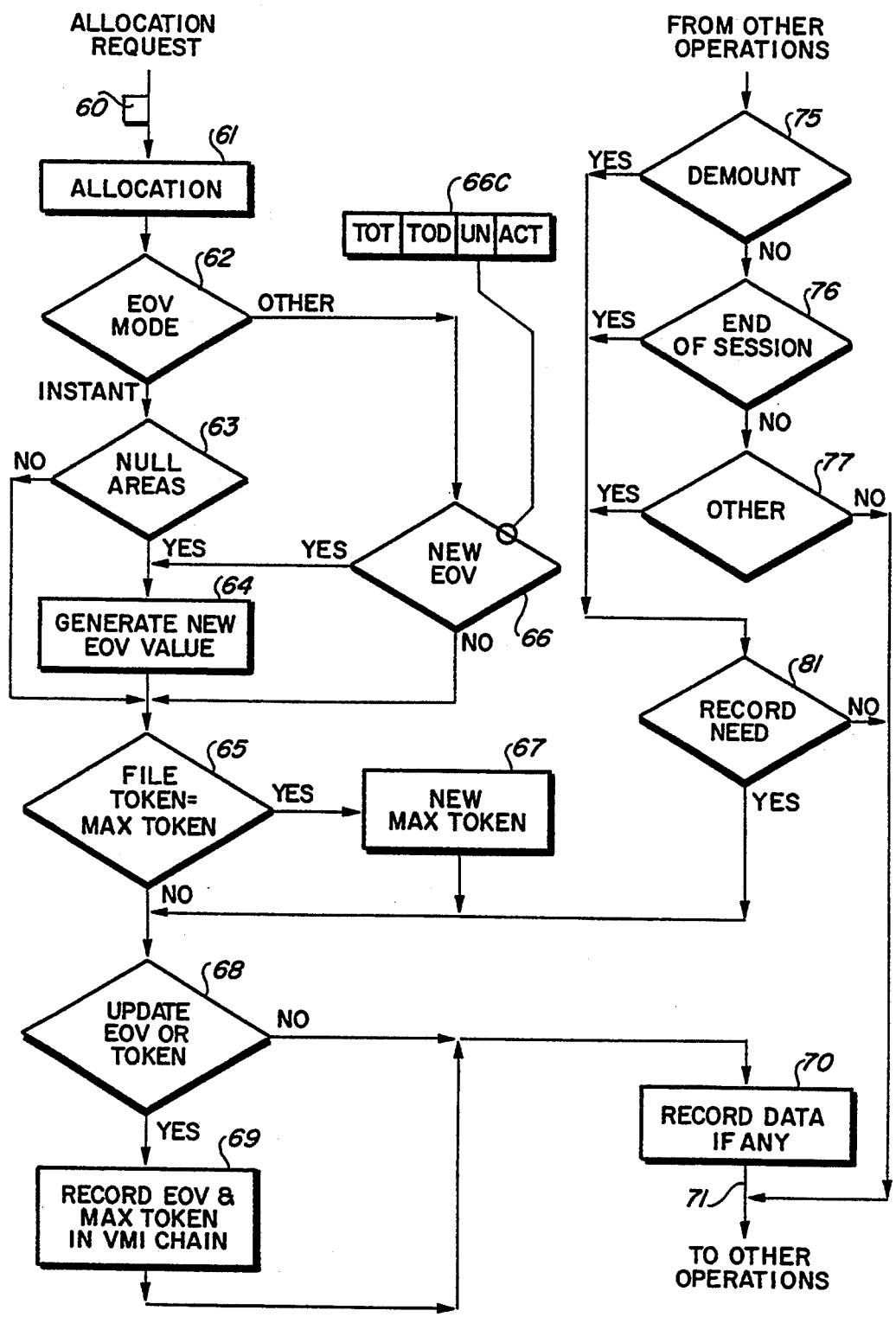

FIG. 6 shows machine operations for updating and recording the max token value and the EOV value after each allocation of space for data recording. Certain systems status changes, such as upon a demount command, upon receiving an end of session indication and at other times, such as when a time out time expires, time of day, activity level indication change, etc., certain recording operations may be desired. Such desired recording occurs when updated values in EOV and max token have not been recorded when the status change is about to occur. In any constructed system, any one, some or all of the described criteria and methods, and their equivalents, may be used for practicing the present invention.

Upon receiving an allocation request over machine operations flow path entry at numeral 60 from other programs (not shown) in host processor 10, file manager 11 executes allocation step 61. Allocation step 61 allocates a number of the addressable data-storing areas, such as areas 23, for an ensuing recording operation(s). Two known modes of allocation may be used, both modes having variants, as is known. As usual, in each allocation contiguous null areas are allocated. In a first mode, allocation step 61 allocates a number of areas sufficient to store data of a file or file portion to be recorded. The other programs (not shown) of host processor 10 indicate to file manager 11 the desired number of areas. In the next ensuing recording operation, data are recorded in all of the just-allocated areas. In a second mode, file manager 61 in allocation step 61 allocates a number of areas exceeding the number of areas required in the next ensuing recording operation for the just-allocated areas. Host processor 10 may indicate the number of desired areas to be allocated or the allocation request may inferentially indicate that a predetermined number of areas are to be allocated. That is, the allocation request may include information to be interpreted by file manager 11 as indicating a given number of areas for the allocation. In the present illustration, the mode used is a criterion for updating and recording the EOV value. Whenever the selection of the number of areas to be allocated may be completely controlled by host processor 10 independently of file manager 11, then host processor 10 other programs (not shown) may send an EOV update indicating flag to file manager 11 commanding updating the EOV value either after the allocation step 61 or at some other time.

The invention also makes the allocation steps independent of the recording steps. That is, usually recording closely follows allocation of areas; the invention enables leaving allocated unused areas for much later recording yet providing rapid identification of the true end of volume for future allocations.

Upon completing the allocation, file manager proceeds to machine step 62 for determining the selected control mode for updating EOV. The "instant" EOV update mode results in updating the EOV value immediately after the allocation step 61 effected an allocation in its second mode; otherwise, any allocation completed in the first mode results in not updating the EOV value. Assuming the instant mode, file manager 11 in machine step 63 determines the mode used in the prior allocation, i.e. if in the second mode null areas will occur. In this instance, file manager 11 proceeds to machine step 64 to generate an updated EOV value. The updated EOV value is stored in RAM 12 for recording on disk 15 by file manager 11 until the later described machine operations relating to the max token have been completed.

If at machine step 63, the last allocation step 61 execution was in the first mode, then file manager 11 proceeds to machine step 65 for evaluating the new file-indicating token value with respect to the current max token value. Machine step 65 is also executed from machine steps 64 or 66. Machine step 64 is identical to previously described machine step 52 of FIG. 5.

If the EOV mode at machine step 62 is "other", then file manager 11 in machine step 66 ascertains whether or not criteria other than leaving null areas in an allocated group of sectors require an immediate or deferred generation of a new EOV value. Register 66C stores control data from other programs (not shown) of host processor 10 which may indicate a new EOV value is required. Diverse criteria may be used either singly or in predetermined combinations, all depending on system design and programming. The examples given are not exhaustive of criteria useable for effecting updating the EOV value. Examples given as being in register 66C are expiration of a time-out timer (TOT), reaching a predetermined time of day (TOD), user data file allocation may or may not result in leaving null areas after the first ensuing recording (UN) or the type of and intensity of activity (ACT) is such in a recent computing past indicates an advantage of updating the EOV value. Such activity may include a predetermined number of successive allocations in repeated executions of allocation step 61 or a predetermined number of areas have been allocated by such executions of machine step 61. From the above description, it is readily seen that a great variety of criteria may be used for activating an update to the EOV value.

In accordance with one aspect of the ACT control of register 66C, allocation step 61 performs an umbrella or super allocation of space in anticipation of upcoming allocations to be performed within the umbrella allocated space. The EOV pointer is advanced to point to the end of the umbrella allocated space. Whenever the umbrella allocated space is exceeded, then a new umbrella space is allocated and the EOV pointer advanced for pointing to the end of that space. That is, the EOV pointer can be advanced to the highest address being currently considered for use and be written to the VMI continuation chain. The umbrella EOV pointer may be the max token 30; thereby at each umbrella allocation the VMI chain is updated as described herein.

As long as the disk medium is contained within player 14 and the receiver 14R is under machine control, the disk medium can be considered as being in a closed environment, such as later described with respect to FIGS. 8 and 9. The procedures set forth in FIG. 9 can be applied to each individual player; in such an instance, a shadow EOV is stored in a retentive store, such as store 92 of FIG. 8. This procedure further limits the number of times the max token value and the EOV value have to be recorded in the VMI continuation chain.

In the latter described procedure, at dismount command or at some predetermined other time (elapsed time, number of allocations, etc) file manager 11 analyzes the allocations made in the umbrella allocation area. The analyzed allocation status may indicate that the umbrella EOV could be made smaller in value. At this point in time, both the umbrella EOV and max token values (whether different or the same values) can be reduced whenever the allocation of space actually being used is proceeding such that all allocated sectors or areas are being filled (there are not allocated and unrecorded areas or sectors in recent allocations) such that the least permitted EOV value is less than the current EOV value. From the above few paragraphs, it is readily seen that there are many variations of control possible when practicing the present invention.

Machine step 65 is entered from either machine step 66 indicating no new EOV value is to be generated, from machine step 64 or from machine step 63. In executing machine step 65, if a new max token value is required, file manager 11 executes machine step 67 for generating a new max token value; machine step 67 is identical to previously described machine step 55 of FIG. 5. From either machine step 65 or 67, file manager 11 in machine step 68 reads RAM 12 to determined whether or not either the EOV value or the max token value were updated in the current pass through the illustrated machine operations. If either one of the EOV or max token values were updated, then at machine step 69 a new entry in the VMI continuation chain (FIG. 3) is created and recorded in its first null sector. In FIG. 3, area 28 is the current last area of the VMI continuation chain resulting in the new VMI entry being recorded in area 29, the null area next to area 28. All unchanged information of the current VMI entry is also recorded.

From either machine step 68 (no updating of EOV or max token) or from machine step 69, data recording ensues in machine step 70 whenever data are to be recorded. Such recording operation may have been queued in host processor 10 or may require other activity beyond the present description. From machine step 70, file manager 11 and other programming of host processor 10 proceed to other machine operations.

Based upon systems considerations, certain system status changes may require recording an unrecorded EOV value or max token value. If a volume or disk demount command is given, then from machine step 75 file manager 11 proceeds over machine operations path 80 to machine step 81. In machine step 81, file manager 11 determines by examining RAM 12 contents whether or not a new VMI entry is required. In addition to having a current EOV value or max token value in file manager 11 that is different from the currently stored values in the VMI continuation chain, other control data changes may indicate a need for building and recording a new VMI entry. In this instance, machine steps 68 et seq may be executed for including any unrecorded updated values of EOV or max token. If no recording need is required, the other operations ensue via operations path 71 are performed. Other systems status that requires attention include an end of a disk session (without demount, for example) detected at machine step 76 or another system status (not described) detected at machine step 77.

Figure 7:
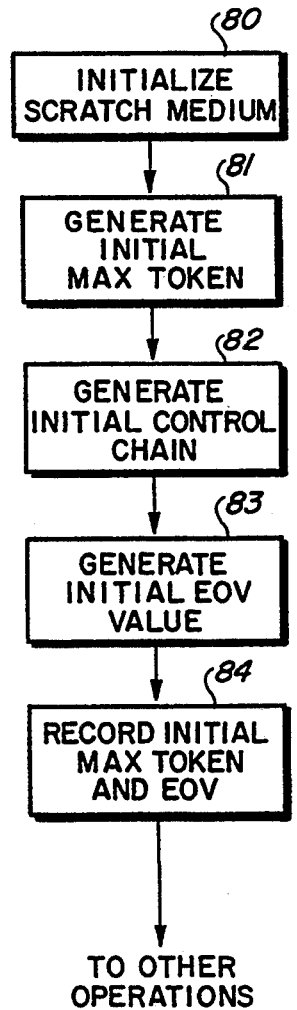

FIG. 7 illustrates an initialization of disk 15. A so-called scratch disk 15 is mounted for operation in player 14 at machine step 80 and initialized for recording in a usual manner. Mounting may be manual or automatic. At machine step 81, file manager 11 responds to completion of the machine step 80 initialization to generate an initial max token value which may be 512, for example. File-indicating token values may start with unity, or any other integral value, preferably positive. Machine step 82 generates initial control chains needed for recording on disk 15, such chains will include allocating group 20 of the VMI continuation chain in FIG. 3. File manager 11 at machine step 83 then generates the first EOV value pointing to the last allocated addressable data-storing area in these control chains. File manager 11 then records the initial max token value and EOV value in the first allocated area of group 20.

Figure 8:
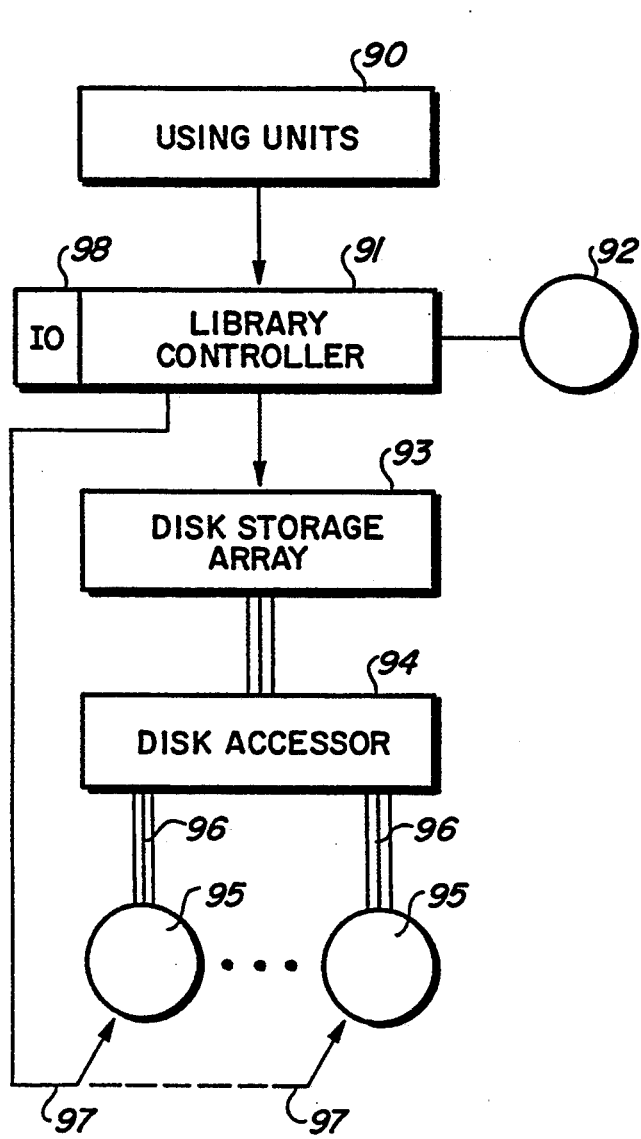
FIGS. 8 and 9 are simplified presentations of practicing the invention in a controlled environment, such as in an optical disk library system.
Figure 9:
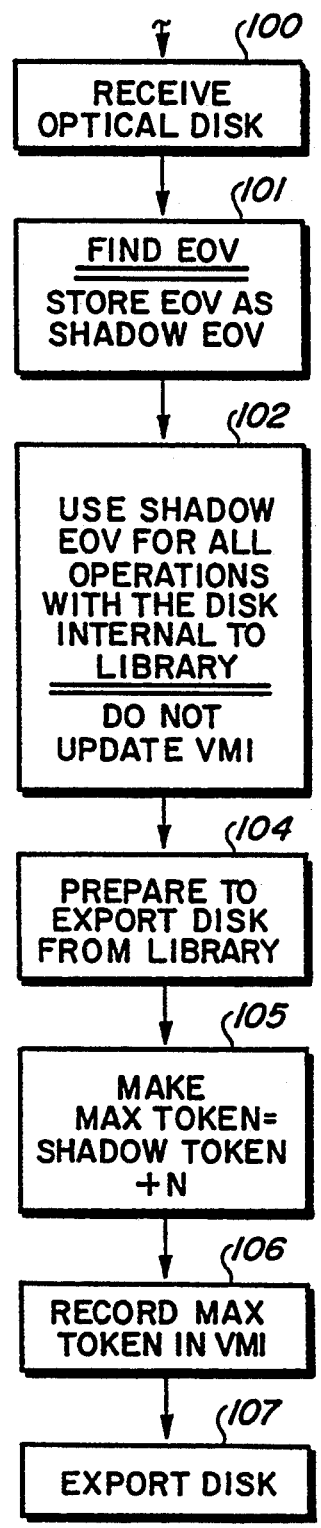

FIGS. 8 and 9 illustrate, in simplified form, an embodiment employing the present invention in a closed operating environment, i.e. an environment in which the disk media is continuously under automatic machine control whether mounted on a disk player for recording or playback operations or stored elsewhere, such as in a library array of storage slots. One or more using units 90, such as host processor 10 of FIG. 1, are connected to a library controller 91. Library controller 91 may replace controller 13 and file manager 11 of FIG. 1, or parts thereof as befits a given system design. The illustrated closed environment is effected by a library system including the library controller 91 which has a magnetic disk storage unit 92 (or other form of retentive storage) for storing control information. Disk storage array 93 which can be a rectilinear array, tubular array, etc, stores a plurality of disk media in a number of addressable disk storage compartments or slots. Automatic disk accessor 94 addressably accesses individual disk storage compartments or slots of array 91 for storing disk media in respective ones of the compartments and for fetching disk media stored in ones of the compartments. Disk accessor 94 may have one or more travelling elevators with suitable disk media handling apparatus, as is known. Disk accessor 94 transports the disk media, upon library controller 91 commands, to and from addressed ones of a plurality of disk players 95, each of which has a disk receiver such as receiver 14R, such transport being represented by the triad lines 96. Disk players 95 are controlled by library controller 91 as indicated by line 97. Data transfers also travel over a cable included in line 97, as is known in the art. The above-described apparatus keeps all disk media under automatic machine control of library controller 91 as commanded and referenced by using units 90. Disk media are controllably inputted into and removed from disk array 93 via IO or input-output station 98. The machine control of IO 98 will become apparent from FIG. 9. It is to be understood that disk accessor 94 accesses IO 98 as if it were one or more ones of the addressable compartments of array 91. IO 98 may have one input port for inputting disk media serially into array 91 and one output port for removing disk media from array 91; any number of ports may be provided for effecting this input and removal function. IO 98 may be either manually or automatically loaded or unloaded.

In FIG. 9, the FIG. 8 illustrated library system at machine step 100 receives an optical disk in IO 98 for storage in array 91 and usage in the library system under continuous control of library controller 91. IO 98 has a suitable sensing mechanism (not shown) for detecting and indicating a received disk medium. Library controller 91 responds to such indication for actuating disk actuator 94 to transport the received disk medium to an addressed one of the optical disk players 95. At this point in time, library controller 91 actuates the addressed disk player 95 holding the input disk medium to find its EOV. For a scratch or unrecorded disk medium, library controller 91 commands a format of the scratch disk and generation of an initial EOV which is not recorded on the input disk medium, rather the initial EOV is recorded as a shadow EOV in retentive store 92 along with an internal designation for the input disk medium. Such initial EOV is stored as a so-called shadow EOV. For a partially or fully recorded input disk, the EOV is automatically determined as described for FIG. 4. That determined EOV is then recorded in retentive store 92 as the shadow EOV. Note that at this point in time, the max token value is not necessarily processed; it being understood that the max token value, if any, of a received disk medium may be read and stored alongside the shadow EOV. As mentioned above, accessing the stored EOV and other information about the received disk medium, is by an internal designation of the disk medium. Such internal designation may take any one of a plurality of forms. By way of example, the internal designation may be the array 93 compartment address in which the received disk medium is to be stored while in the closed environment, may be a serial number of the received disk medium for facilitating using any one of the addressable array 93 compartments to store the disk medium, and the like.

Machine step 102 of FIG. 9 indicates that a plurality of operations may be performed on the received disk medium while it is resident in the library system or closed environment. Each time a new EOV is generated for any of the disk media in the library system, the shadow EOV is updated with the latest value of the shadow EOV being retentively stored in store 92. During this period of residency of the disk media, the max token values of the all of the library system controlled disk media are altered in any of the VMI chains of such disk media.

At some time, it is desired to export or remove some of the library system controlled disk media. Library controller 91 receives from a one of the using units 90 a command to remove a given disk medium, or library controller 91 may have evaluation programming which matches the current shadow EOV value with a threshold value for ascertaining whether or not significant or usable recording space still is on which disk media. A least recently used (LRU) control may be used to select a disk medium for export from the library system. In any event, at machine step 104, library controller 91 prepares to export a disk medium. At machine step 105 a max token value is generated as being a value "n", n is an integer, greater than the current shadow token value. If the volume capacity of the disk medium to be exported has been filled, then the max token value is set to the medium capacity and the EOV is set to the max token value for indicating that the disk medium is full. Then library controller 91 records the max token value, along with other control information as shown in FIG. 3, in the VMI continuation chain of the disk medium to be exported. Upon successfully completing updating the VMI chain, the disk medium is physically exported or removed from the library system at machine step 107 via IO 98. Library controller 91 then updates retentive store 92 to reflect such exportation. Such control data may also be reported to interested ones of the using units 90 in a usual manner.

While the invention has been particularly shown and described with reference to preferred embodiments thereof, it will be understood by those skilled in the art that various changes in form and details may be made therein without departing from the spirit and scope of the invention.

What is claimed is:

1. A machine-effected method of recording data on a write-once read-many optical medium, the medium having a multiplicity of unallocated addressable data storing areas addressable in a range of addresses from a first low address to a second high address, including the machine-executed steps of:

automatically allocating contiguous first predetermined ones of said unallocated addressable data storing areas beginning with said first low address and proceeding sequentially in addresses toward said second high address for identifying first predetermined allocated addressable data storage areas;

automatically recording data in second predetermined ones of the allocated addressable data storing areas, a second number of said second predetermined ones of the allocated addressable areas being fewer than a first number of said first predetermined allocated addressable data storage areas;

automatically indicating the first end of volume of the medium is at an address of the unrecorded allocated data storing area having a highest address of any of the unrecorded allocated data storing areas;

repeatedly recording data in said unrecorded allocated data storage areas of said first predetermined allocated addressable data storage areas;

indicating that predetermined data are to be recorded in additional ones of said unallocated addressable data storage areas having addresses greater than said end of volume address;

allocating second predetermined ones of said unallocated addressable data storage areas having addresses greater than said end of volume address for indicating second predetermined allocated addressable data storage areas;

automatically changing said indicating the first end of volume to a second end of volume having an address of an unrecorded allocated data storage area having a greatest address of said second predetermined allocated addressable data storage areas; and automatically recording said predetermined data in unrecorded ones of said first and second allocated data storing areas.

2. In the machine-effected method set forth in claim 1 further including the machine-executed steps of:

in said step of automatically recording said predetermined data in unrecorded ones of said first and second allocated data storing areas, automatically leaving a predetermined one of the allocated second predetermined ones of said second allocated addressable data storing areas unrecorded.

3. A machine-effected method of recording status of a data storage medium having a plurality of addressable data storage areas and addressing means for addressing said data storage areas, including the machine-executed steps of:

recording a plurality of files on the data storage medium respectively in a plurality of continuation chains, recording each said continuation chain as a linked list of file-related ones of said data storage areas, sequentially recording said data in each of said continuation chains being from one end toward a last-recorded end of each said continuation chain;

establishing first and second control ones of said plurality of continuation chains as an addressable control area on the storage medium;

automatically generating a file-indicating token for each of said continuation chains in a predetermined sequence of numbers such that each of said continuation chain is identified on the data-storing medium by respective ones of said file-indicating tokens;

recording each of said file-indicating tokens in said first one of said control ones of said continuation chains for identifying the respective continuation chains;

automatically finding one of said file-indicating tokens having a highest file number, then establishing a maximum value token for the data storing medium and generating a value in said maximum value token greater than said highest file number by a predetermined value;

automatically repeatedly generating said file-indicating tokens having successively greater values in said predetermined sequence of numbers for assigning said generated numbers respectively to respectively indicate respective ones of said files sequentially recorded on the data storing medium, storing each of said generated file-indicating tokens in said first one of said control ones of said continuation chains;

automatically comparing each of the assigned greater values with the maximum value token; if the assigned file-indicating token value is greater than the maximum value token value, then establishing a new maximum value token having a value greater than the compared greater value by said predetermined value and recording the new maximum value token on the medium in said second one of said control ones of said continuation chains for indicating that all of said file-indicating tokens recorded in said first one of said control ones of said continuation chains have a value less than said new maximum value token.

4. In the machine-effected method set forth in claim 3 further including the machine-executed steps of:

automatically selecting the data storing medium to be a write-once optical disk;

automatically establishing a new continuation chain having a predetermined number of allocated addressable data storage areas on the medium; and automatically serially recording on the data storing medium the file-indicating tokens in said first one of said control ones of said continuation chains in an order of establishment such that the last recorded maximum value token indicates an unused file-indicating token number.

5. In the machine-effected method set forth in claim 4 further including the machine-executed steps of:

automatically sensing and indicating that an optical medium was just mounted in an optical player;

automatically finding and reading the last recorded maximum value token recorded in the first one of said control ones of said continuation chains; and automatically establishing a next file-indicating token having a value in said predetermined sequence of numbers having a predetermined value difference from the just-read maximum value token.

6. In the machine-effected method set forth in claim 5 further including the machine-executed steps of:

automatically repeatedly allocating groups of addressable areas of the optical medium for later receiving and recording data to be stored;

automatically repeatedly automatically establishing an end of volume (EOV) pointer separate from said addressing means and having an address of an addressable area of the optical medium having a predetermined address value difference from a last allocated group of said addressable areas such that said EOV pointer continuously and separately from said addressing means points to the end of volume on said data storage medium; and automatically recording the established EOV pointer and said maximum value token in a allocated unrecorded one of the addressable areas in said second one of said control ones of said plurality of continuation chains.

7. In the machine-effected method set forth in claim 6, further including the machine-executed steps of:

after said sensing and indicating step, automatically finding and reading a last recorded one of said EOV pointers;

automatically establishing a shadow EOV pointer and storing said shadow EOV pointer in a random access memory;

automatically updating the shadow EOV pointer each time a group of addressable areas is allocated; and automatically recording the updated shadow EOV pointer in the second one of said control ones of said continuation chains as an EOV pointer.

8. In the machine-effected method set forth in claim 7, further including the machine-executed steps of:

automatically allocating a group of said addressable storage areas for later recording; and upon completing the allocation, performing said automatically establishing a new EOV pointer step and then automatically recording said new EOV pointer and said maximum value token in said second one of said control ones of said plurality of continuation chains.

9. In the machine-effected method set forth in claim 7 further including the machine-executed steps of:

automatically allocating a group of said addressable areas for a predetermined one of said plurality of continuation chains; and automatically performing one of the repeatedly automatically establishing an EOV pointer steps; and then automatically performing said automatically recording the last-mentioned established EOV pointer and said maximum value token in said second one of said control ones of said plurality of continuation chains.

10. In the machine-effected method set forth in claim 7 further including the machine-executed steps of:

automatically establishing predetermined criteria for recording in said second one of said control ones of said plurality of continuation chains either a newly established EOV pointer or a newly established maximum value token;

after establishing a new EOV pointer or a new maximum value token, performing said step of recording the EOV pointer and said maximum value token in the second one of said control ones of said plurality of continuation chains.

11. In the machine-effected method set forth in claim 10 further including the machine-executed steps of:

automatically allocating a group of said addressable areas to be immediately recorded; and automatically withholding generating a new EOV pointer.

12. In the machine-effected method set forth in claim 11 further including the machine-executed steps of:

automatically allocating a like number of the addressable areas in each one of said groups of said addressable areas being allocated for said predetermined one of said plurality of said continuation chains; and automatically allocating a variable number of the addressable areas while allocating addressable areas for said control ones of said plurality of continuation chains.

13. In the machine-effected method set forth in claim 11, further including the machine-executed steps of:

mounting the optical medium in an optical player for recording and reading operations;

automatically preparing to demount the optical medium from the player; and during said preparing to demount step recording the EOV pointer and the maximum value token in said second one of said control ones of said plurality of continuation chains.

14. In the machine-effected method set forth in claim 11, further including the machine-executed steps of:

automatically preparing to end a computing session using said optical player including recording said shadow EOV pointer and said maximum value token in said second one of said control ones of said plurality of continuation chains.

15. In the machine-effected method set forth in claim 11, further including the machine-executed steps of:

automatically establishing predetermined operations criteria for the optical player including specifying predetermined conditions that may meet the operations criteria;

automatically monitoring the operation of the optical player including detecting said specified predetermined conditions, comparing the detected specified predetermined conditions and the operations criteria and each time predetermined one(s) of the specified predetermined conditions meet the operations criteria generating a record flag; and automatically detecting the record flag and then recording said shadow EOV pointer and said maximum value token in the second one of said control ones of said plurality of continuation chains.

16. In the machine-effected method set forth in claim 15 further including the machine-executed steps of:

automatically indicating a first one of said specified predetermined conditions while recording in said predetermined one of said plurality of continuation chains; and automatically indicating a second one of said specified predetermined conditions different from the first one of said specified predetermined conditions while recording in the medium outside of said predetermined one of said plurality of continuation chains.

17. In the machine-effected method set forth in claim 3, further including the machine-executed steps of:

automatically repeatedly allocating groups of said addressable areas of the data storage medium for later receiving and recording data to be stored;

repeatedly automatically establishing an end of volume (EOV) pointer having an address of an addressable area of the optical medium of a last allocated one of said groups of addressable areas; and automatically recording the established EOV pointer and said maximum value token in an unused one of the addressable areas in said second one of said control ones of said plurality of continuation chains.

18. In the machine-effected method set forth in claim 17 further including the machine-executed steps of:

after said sensing and indicating step, automatically finding and reading a last recorded one of said EOV pointers from said second one of said control ones of said plurality of continuation chains;

automatically establishing a shadow EOV pointer and storing said shadow EOV pointer in a random access memory;

automatically updating the shadow EOV pointer each time a group of said addressable areas is allocated to one of said plurality of continuation chains; and automatically recording the updated shadow EOV pointer in the second one of said control ones of said plurality of continuation chain as said last recorded EOV pointer.

19. In the machine-effected method set forth in claim 3 further including the machine-executed steps of:

automatically continuously retaining the data storage medium in a machine controlled environment;

while continuously retaining the data storage medium in the machine controlled environment, not performing said automatically comparing step, rather repeatedly assigning said successively greater values irrespective of the maximum token value;

automatically retentively storing in a predetermined retentive data store separately from the data storage medium a last file-indicating token value;

indicating that the data storage medium is to be no longer continuously retained in the machine controlled environment; and then, performing said automatically comparing step between a last assigned file-indicating token value for generating and recording a new maximum value token on the data storage medium.

20. In the machine-effected method set forth in claim 19 further including the machine-executed steps of:

including in said machine controlled environment an optical disk player having an machine effected reception and ejection of the data storage medium and while the data storage medium is being continuously retained in the optical disk player, not performing the automatically comparing step until the indication of the data storage member to be on longer retained occurs, then performing the automatically comparing step and recording the new max token value on the data storage member; and automatically ejecting the data storage member from the player.

21. In the machine-effected method set forth in claim 19 further including in said controlled machine environment a plurality of optical disk players operatively connected to a disk library having means for automatically transferring disks between the library and the players, the library including a storage media ingress-egress station for receiving and ejecting data storage media including said data storage medium; the machine-executed steps of:

receiving the data storage medium into the disk library and indicating a continuous retention of the data storage medium such that the continuously retaining step is performed while the data storage medium is retained either in said library, in any of said plurality of players or being automatically transported therebetween; and upon performing said indicating step, then generating a new maximum token value, recording the new maximum token value onto the data storage medium and then ejecting the data storage medium from the library via said ingress-egress station.

22. In apparatus for storing and retrieving data to and from an optical medium including, in combination:

optical data storage means in an operative optical data-transferring relationship with the optical medium for storing and retrieving data on and from the optical medium, the optical medium having a multiplicity of addressable data storing areas;

computer means connected to the optical data storage means and having operating indicia means for enabling the computer means to actuate the optical data storage means to access said addressable data storing areas for effecting said storing and retrieving;

allocation program indicia in the computer means for enabling the computer means to allocate groups of said addressable data storing areas for receiving predetermined data including control or user data;

file token indicia means in the computer means for enabling the computer means to establish and record on the optical record medium file tokens respectively having predetermined values for indicating files stored on the optical medium, further token indicia for enabling the computer means to serially assign said values in a predetermined sequence of said values and for changing the successive token values by a first predetermined value for each successive ones of the files wherein a last assigned one of the values is a current file token value;

max token indicia means in the computer means for enabling the computer means to generate a new max token having a value greater than a current max token value by a second predetermined value wherein the second predetermined value is an integer substantially greater in value than the first predetermined value, including new indicia means to establish the new max token value as a current max token value such that there is only one current max token value at any instant;

comparison indicia means in the computer means for enabling the file manager to compare the current token value with the current max token value, including result program indicia for enabling the computer means to respond to the comparison of the current values indicating a predetermined near equality to actuate the max token indicia means to generate a new max token value; and control recording indicia means in the operating program indicia for enabling the computer means to record each new max token value as a current max token value on the optical medium.

23. In the apparatus set forth in claim 22 further including, in combination:

receiver means in the optical data storage means for removably receiving the optical medium and including means indicating that an optical medium has been received;

start-up indicia means in the computer means for enabling the computer means to respond to the indicating means indicating a received optical medium to actuate the operating program indicia to read recorded data on the optical medium including the current max token value and for storing the current max token value in the computer means.

24. In the apparatus set forth in claim 23 further including, in combination:

the allocation indicia means including first and second modes of allocation;

EOV indicia means in the computer means for enabling the computer means to respond to each allocation enabled by the allocation indicia means for ascertaining a mode of allocation, if the mode of allocation was in a second mode to generate an end to volume (EOV) value having a predetermined numerical relationship to a predetermined one of the addresses of ones of the addressable data-storing areas allocated in said second mode; and the control indicia means enabling the computer means to respond to generation of a new end of volume value to actuate the optical data storing means to record the generated new end of volume value on the optical medium.

25. In the apparatus set forth in claim 24 further including, in combination:

the start-up indicia means including first additional indicia for enabling the computer means to read the recorded end of volume value and store the read end of volume value in the computer means; and the start-up indicia means further including second additional indicia means for enabling the computer means to actuate the optical data storing means to access a predetermined one of the addressable data-storing areas of the optical medium indicated by the stored end of volume value, scan indicia means in the second additional indicia means for enabling the computer means to actuate the optical data storing means to scan the optical medium beginning at the predetermined one of the addressable data-storing area and scanning addressable data-storing areas having stored data therein and for stopping the scan while a second predetermined one of the addressable data-storing areas contains no data and for indicating a true end of volume as the address of said second predetermined one of the addressable data-storing areas wherein the first and second predetermined ones maybe the same addressable data storing area.

26. In the apparatus set forth in claim 25 further including, in combination:

criteria means in the computer means for indicating criteria for recording a max token value or an EOV pointer value;

the control recording indicia means having criteria indicia means for enabling the computer means to respond to the recording criteria and a current value of the file token and the allocation mode for actuating the optical data storage means to record the values of said max token and EOV pointer on the optical medium.

27. In the apparatus set forth in claim 23 further including, in combination:

environment means in the optical data storage means and connected to the computer means for continuously retaining under machine control the optical medium including means indicating that the optical medium is being continuously retained;

retentive data storage means in the computer means;

intervening indicia means in the computer means for enabling the computer means to respond to the continuous retention indication to bypass executing said max token indicia means and to record each last assigned file token values in said retentive data storage means and to assign each succeeding file token value using the retentive data storage means stored file token value plus a predetermined value increment;

ejection indicia means in the computer means for enabling the computer means to first effect a comparison between the stored file token value and said max token value for generating a new max token value, then to record the max token value on the optical medium and to actuate the environment means to eject the optical medium.

28. In the apparatus set forth in claim 27 further including, in combination:

said optical data storage means including an optical media library capable of storing a plurality of optical media, each of said optical media being a said optical medium, a plurality of optical media players operatively connected to the optical media library such that optical media are automatically transferred between the optical library and any one of the optical players, an ingress-egress station in the data storage means for receiving optical media to be stored in the optical library and to eject optical media from the optical data storage means including from the optical library;

ingress indicia means for enabling the computer means to monitor each reception of a one of the optical media and for enabling the computer means to actuate the optical data storage means to read a current max token value from each just-received optical media and for storing the read values in the retentive data storage means;

intervening indicia means in the computer means for enabling the computer means to respond to the reception of each of the optical media to bypass executing said max token indicia means and to record each last assigned file token values in said retentive data storage means and to assign each succeeding file token value using the retentive data storage means stored file token value plus a predetermined value increment;

ejection indicia means in the computer means for enabling the computer means to first effect a comparison between the stored file token value and said max token value for generating a new max token value, then to record the max token value on the optical medium and to actuate the environment means to eject the optical medium.

29. Data storage apparatus having receiver means for receiving an optical medium having a plurality of addressable data storing areas for recording and reading data on and from the received medium, an improvement including, in combination:

token means for generating a predetermined sequence of file token values to be assigned to data files being stored on the received medium;

allocation means for allocating a plurality of groups of said addressable data storing areas of the medium such that each said group has a predetermined number of contiguous ones of said plurality of addressable data storage areas for storing data and allocating a control one of said groups for storing control indicia including a current max token value;

max token means for generating a new max token value having a value substantially greater than a current max token value;

recording means connected to the allocation means and to the max token means for recording the new max token value in the control one of said groups of allocated areas of the optical medium;

current max token means for reading the current max token value from the medium; and comparison means connected to the token means and to the current max token means for comparing the values of the last generated file token with the current max token and having actuating means connected to the max token means and being responsive to the comparison indicating a predetermined numerical relationship between the file token and max token values to generate a new max token value.

30. In the apparatus set forth in claim 29 further including, in combination:

addressing means in the apparatus for addressing said addressable data storage areas;

end of volume means connected to the allocation means and to said addressing means for responding to a predetermined allocation of said addressable data storing areas to generate an end of volume pointer separate from said addressing means having a value indicating a predetermined address value having a predetermined numerical difference from an address of a predetermined one of the addressable data storing areas allocated by the allocation means; and said recording means recording said max token and said end of volume indicator in said control one of said groups.

31. In the apparatus set forth in claim 30 further including, in combination:

control means connected to said end of volume means, said max token means and said recording means for responding to generation of a new max token value or a new end of volume pointer value for recording the last-mentioned values on the received medium.

32. In the apparatus set forth in claim 31 further including, in combination:

criteria means in the control means for indicating to the control means while the last-mentioned values are to be recorded.

* * * * *